United States Patent [19]

Bobard

[11] 4,322,094
[45] Mar. 30, 1982

[54] TRACTOR LOAD

[75] Inventor: Emile Bobard, Gigny-les-Beaune, France

[73] Assignee: Jeune Bobard, Beaune, France; a part interest

[21] Appl. No.: 57,886

[22] Filed: Jul. 16, 1979

[30] Foreign Application Priority Data

Jul. 18, 1978 [FR] France ............................. 78 21639
Apr. 17, 1979 [FR] France ............................. 79 09831

[51] Int. Cl.³ .............................................. B60B 39/00
[52] U.S. Cl. ................................... 280/755; 172/611;
404/130
[58] Field of Search .............. 280/755, 760, 759, 758,
280/757, 727; 172/611, 790; 404/130, 122;
180/900, 54 D, 54 E

[56] References Cited

U.S. PATENT DOCUMENTS

| 2,440,550 | 4/1948 | Martin | 172/611 X |
| 2,774,498 | 12/1956 | Cordes et al. | 180/54 E X |
| 2,849,047 | 8/1958 | Lamont et al. | 152/417 |
| 3,480,294 | 11/1969 | Lichti | 172/611 X |
| 3,595,410 | 7/1971 | Lemmon | 280/755 X |
| 3,636,835 | 1/1972 | Reisser | 404/130 |
| 3,726,416 | 4/1973 | Pottorf et al. | 212/49 |

FOREIGN PATENT DOCUMENTS

| 635854 | 1/1928 | France | 280/755 |
| 1018602 | 10/1952 | France . | |
| 2379975 | 9/1978 | France . | |
| 700961 | 6/1966 | Italy | 280/755 |
| 387888 | 2/1933 | United Kingdom . | |
| 597109 | 1/1948 | United Kingdom . | |
| 604852 | 7/1948 | United Kingdom . | |
| 890134 | 2/1962 | United Kingdom . | |
| 1248889 | 10/1971 | United Kingdom . | |
| 1461970 | 1/1977 | United Kingdom . | |
| 1538910 | 1/1979 | United Kingdom . | |
| 1548555 | 7/1979 | United Kingdom . | |

Primary Examiner—Joseph F. Peters, Jr.
Assistant Examiner—Milton L. Smith
Attorney, Agent, or Firm—Sandler & Greenblum

[57] ABSTRACT

A weighting device is suspended beneath a tractor and between its wheels to improve the traction of the wheels and the stability of the tractor. The device has the general form of a flat, elongated element with a width substantially less than the spacing between the wheels of the tractor and which extends from at least the rear of the tractor to a point beyond the front of the tractor in order to carry weights which are utilized to prevent the tractor from rearing or lifting. The weight is suspended on the tractor by elements which include flaps, sliding shoulders integral with the tractor, sliding wing flanges and jacks. The jacks may be controlled by fluid distributors for driving the device, and therefore the weights, both longitudinally and transversely along a plane substantially parallel to the ground or other support surface.

21 Claims, 8 Drawing Figures

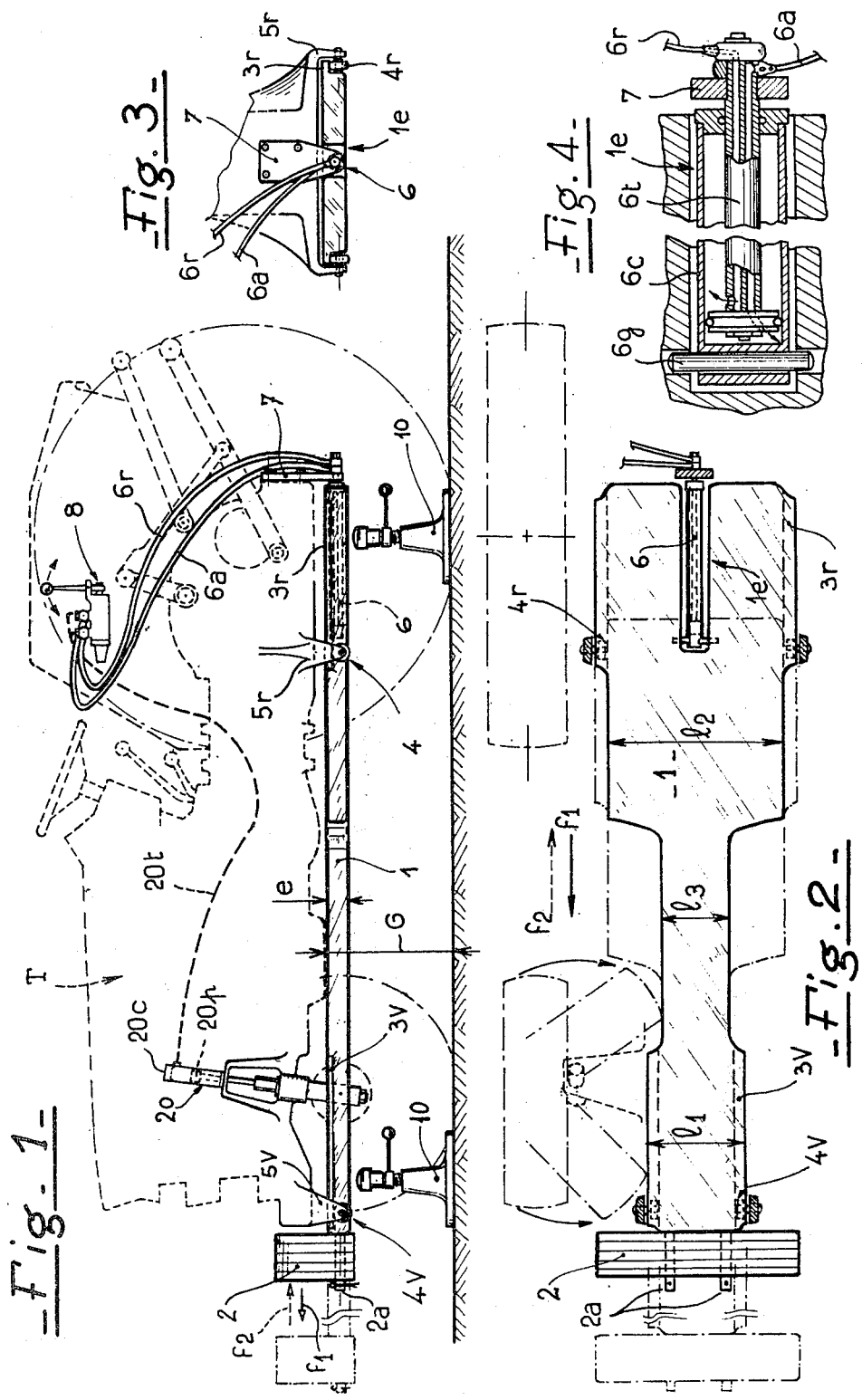

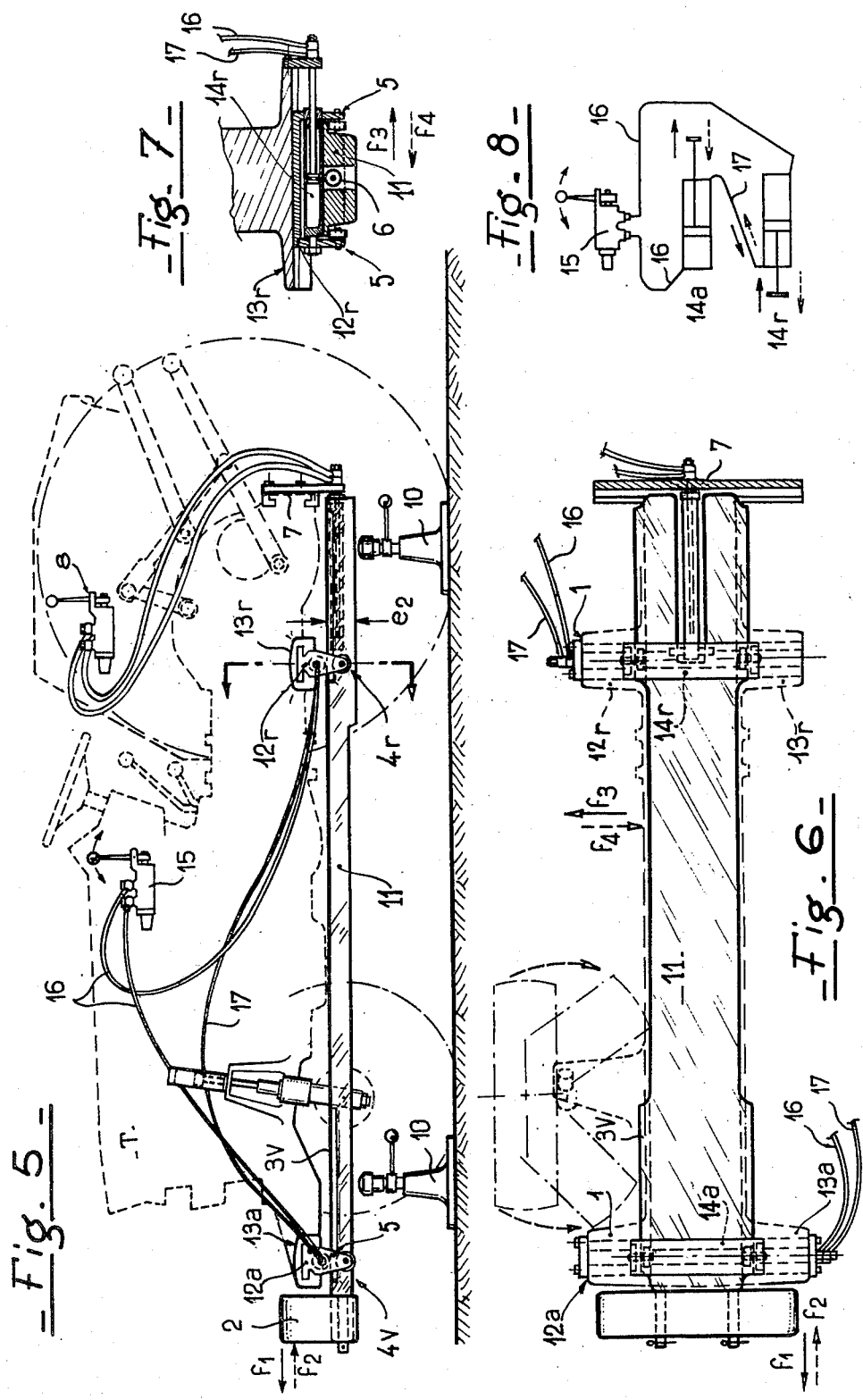

TRACTOR LOAD

BACKGROUND OF THE INVENTION

1. Field of the Invention

The invention relates to a weighting device adapted to optimize the operating conditions of a tractor, particularly those of the traction of the wheels and of the stability of the tractor.

2. Description of Prior Art

In order to avoid the manipulation of very heavy masses which are necessary for the traction of the wheels of a tractor in the case of tilling, for example, French Pat. No. 1,018,602 has proposed making the tractor heavier by suspending a removable weight between its two wheel sets.

This patent has additionally proposed adapting the axial position of the weight with respect to the wheels so as to obtain optimal drive conditions and optimal safety with respect to rearing or lifting of the tractor.

Yet, by virtue of the growth of technology relative to tractors, particularly with respect to the increase in the power of tractors, the proposed weight becomes too cumbersome beneath the tractor so as to reduce in bothersome fashion the road clearance of the tractor while not preventing rearing.

SUMMARY OF THE INVENTION

It is, therefore, an object of the invention to provide a device adapted to increase the traction and safety of tractors.

These and other objects are fulfilled by means of the device of the invention which is adapted to increase the traction and stability of a tractor without interfering with the wheel hop of the steering or guide wheels of the tractor. The wheel hop referred to herein is understood to correspond to the spacing between the pivots supporting the wheels of the tractor and the underbody of the tractor. Wheel hop is referred to hereinafter as the space needed for each of the turning, i.e., front, wheels of the tractor to move in order to change the direction of the tractor to a desired and necessary degree. This spacing must necessarily be provided between the pivot point of each of the turning wheels and the underbody of the tractor. The device comprises a substantially flat elongated element having a transverse dimension substantially smaller than the spacing between the wheels of the tractor. The elongated element is adapted to extend from at least the rear of the tractor to beyond the front of the tractor. The element is further adapted to support removable weights for preventing the tractor from rearing.

The elongated element may be adapted to be mounted on flap or lug means mounted on the tractor thereby permitting the element to be displaced in a plane substantially parallel to the ground.

Control means may further be provided for controlling the displacement of the elongated element. The control means may be either manual or automatic. The control means may comprise means for sensing load variations on the steering wheels.

The elongated element itself may be a plate comprising two pairs of longitudinal wing flanges adapted to engage sliding means arranged beneath the tractor.

Displacement means for displacing or moving the element relative to the tractor are also provided. The displacement means may comprise a jack having one end adapted to be mounted on the tractor. The jack comprises a displacable piston with fluid supply means connected to a fluid distributor adapted to distribute fluid from a pressurized fluid source whereby the piston reciprocates within the jack thereby displacing the elongated element.

Two additional jacks may be provided for transversely displacing the elongated element relative to the tractor so as to shift its center of gravity. When using this embodiment, the elongated element is held by means of a brace which is itself adapted to be moved transversely thereby moving the element. The brace itself is slidingly engaged by a carrier element mounted on the tractor thereby serving to secure the brace while nevertheless permitting translational movement thereof.

In addition to the device itself, the invention is further directed to the device when used in combination with a tractor such that each of the elements of the device are connected to the tractor according to their adapted configurations.

BRIEF DESCRIPTION OF DRAWINGS

With reference to the annexed drawings:

FIG. 1 illustrates a longitudinal elevational view of a tractor and a weighting device of the invention;

FIGS. 2 and 3 respectively illustrate planar and transverse elevational views of the device of FIG. 1;

FIG. 4 illustrates on a larger scale, in axial cross-section and partially cut away, a jack used in conjunction with the device of FIGS. 1-3;

FIGS. 5-7 respectively illustrate in elevation, planar and transverse cross-sections of an alternative embodiment of FIG. 1; and FIG. 8 is a schematic diagram of the jacks, such as that of FIG. 4 referring to the embodiment of FIGS. 5-7.

DESCRIPTION OF PREFERRED EMBODIMENTS

The invention relates to a load or weighting device which satisfies the conditions of good traction and drive and security against rearing while being easily adaptable to the power of the tractor; this removable device being useable in conjunction with the existing underneath suspension and between the left and right wheels of the tractor.

The invention is directed to a weighting device or load which barely affects the road clearance of the tractor and which is relatively lighter than known loads, while nevertheless resulting in traction and security which is analogous to conventional loads; the device is provided with means for adjusting its position with a view to the optimal utilization of the tractor depending upon the force of the drive force and the slope or the inclination of the terrain being worked.

To this end, a device according to the invention generally comprises a relatively flat and elongated element whose transverse dimensions are substantially less than the spacing provided between the wheels of the tractor and compatible with the wheel hop i.e., the necessary turning or radius of the steering wheels. The elongated element extends, at least, from the rear to a point beyond the front of the tractor where means are provided to carry conventional removable weights to prevent rearing.

Such a device may be used in conjunction with a tractor provided with, for example, simple suspension flaps or lugs, without substantially modifying the road clearance of the tractor.

Furthermore, the device can be sufficiently long so as to yield results, particularly with respect to preventing rearing, similar to those of devices presently used while nevertheless using lighter than conventional weights.

Such a suspension of the weight or load is advantageously assured by means which permit displacement of the weight or load in a substantially horizontal plane.

It is thus seen, that one can adapt the position of the load according to the direction of movement and the conditions of use of the tractor and to slopes or inclinations of the terrain so as to obtain, with a minimal amount of weight, the optimal conditions of use for a tractor.

So as to achieve these results, the means making possible the relative displacements of the weight or load are advantageously associated with control means provided on the tractor and these control means can be manual or operatively linked to other means sensitive to the variations of the loads applied to the wheels, particularly the steering or guide wheels of the tractor.

Thus, optimal conditions of traction and of security relative to the use of a tractor can be assured instantly either manually by the driver or in an automatic fashion.

With reference to the annexed drawings, shown merely by way of example, FIGS. 1-3 illustrate a plate 1 arranged beneath the tractor and between the four wheels i.e., first and second pairs of wheels of a classical tractor T whose outline is shown in dashed lines.

This plate 1 comprises the following three essential portions each having a rectangular shape and each having the same thickness "e":

a front portion having a width $l_1$ and compatible with the free pivoting of the guide or steering wheels;

a rear portion whose width $l_2$, substantially greater than $l_1$, is adapted to that of the wheel spacings of the tractor so as to be easily advanced on the tractor; and a median portion whose width $l_3$ is, in this example, that which is just required for the necessary rigidity of the plate 1.

The elongated element is sufficiently long to extend, at least, from the rear portion to just beyond the front portion of the tractor T; the front face of the plate 1 is provided with two shafts 2a adapted for conventional mounting of weights 2 for preventing rearing of the tractor.

The lateral edges of the front and rear portions of the plate 1 are respectively provided with longitudinal wing flanges 3v and 3r which are supported by sliding means such as respective rollers 4v and 4r (FIG. 3). These rollers 4v and 4r, which in this case comprise four rollers, are rotatably mounted on axles transversely attached on hanging projections 5v and 5r which are provided in pairs at appropriate areas of the chassis of the tractor. The plate 1, thus suspended, is arranged substantially horizontally beneath the chassis by virtue of the wing flanges 3 on the roller tracks formed by the rollers 4 as will be shown below.

The rear portion of the plate 1 has an axial and median groove 1e which is relatively long with respect to its width and in which is arranged a jack 6 whose cylinder 6c has a diameter which is at most equal to the thickness "e" of the plate and a length similar to that of the groove 1e.

The base of each cylinder 6c is fixed by a pin 6a to the end of a groove 1e (FIG. 4) and the shaft 6t of the jack is fixed, at its free end, to a hanging and transverse projection or flap 7 (FIG. 3) which is integral with the rear median portion of the tractor chassis.

The shaft 6t, equipped with the jack piston, comprises two longitudinal fluid supply means in the form of conduits which open adjacent to and, respectively, in front and in back of the piston to assure the two pushing effects (arrows $f_1$ and $f_2$) while avoiding a sliding pipe. These two conduits are suitably connected by two pipes 6a and 6r to a conventional fluid distributor 8 which is arranged within the reach of the tractor driver while being attached to a pressurized fluid supply provided on the tractor and not shown.

It should be understood that the plate 1 can be manufactured, for example, by suitable mold casting techniques; such that a plate adapted for use with a tractor of 45 to 90 hp results in a load of approximately 220 kg. per centimeter of thickness.

As a result, a thickness "e" which is relatively small yields results analogous to those of masses applied to the wheels or liquid ballasts, without substantially reducing the road clearance of the tractor while lowering its center of gravity.

Furthermore, the driver can insure the forward displacement of the plate 1 and the weights which it carries with respect to the wheel sets by translationally adjusting the longitudinal position of the center of gravity of the tractor as a function of the various traction forces and terrain conditions which it encounters.

It should further be noted that one can automatically activate a distributor 8 (for example by a slide valve distributor) each time that the load on the guide wheel on the ground drops below a safe level.

To this end the guide wheel pivots (or the suspension pivots of the wheel pair) can be provided with known means 20 which are sensitive to a predetermined diminution of the load which they receive from the front portion of the tractor to assure, by virtue of lines 20t, the control of the distributor 8. Means 20 may preferably be of the hydraulic type and comprise essentially a cylinder 20c and a piston 20p respectively associated with the chassis and the wheel pivot.

Finally, the plate 1 can (unlike conventional wheel and frontal weights) be easily separated from the tractor whenever necessary.

Thus, three supports 10 of the screw jack type can be arranged under the plate 1 (one in front and two in the rear) and can be activated so as to carry, while barely raising, the plate 1 above the rollers 4.

After having disengaged the shaft 6t from the flap or lug 7 it is only necessary to displace the tractor rearwardly so as to place the plate and its weights on the supports 10. Operations opposite to those just mentioned, obviously assure by longitudinal advancement, a pick-up of the plate 1.

Advantageous results, due to the possibility of adjusting the longitudinal position of the center of gravity, can also be extended along the transverse direction when the tractor is used on a slope or inclined terrain.

To this end, the embodiment of FIGS. 5 to 7 is in the form of a flat elongated element which is substantially rectangular and has a width which is on the order of the size of that of the front portion of plate 1. The thickness "e2" of the rear portion (and possibly of the front portion) can be greater than that of the other portions so as to achieve a good distribution of the loads on the wheels. The two longitudinal wing pairs 3 which it comprises are carried, as above, by rollers 4, which are in this case mounted on hanging protrusions of braces arranged in front section 12a and in rear portion 12r.

Each suspension brace (for example 12a) comprises lateral edges, which are slidably engaged in grooves provided transversely in a transverse shoulder 13a integral (in this case) with the front portion of the tractor, in a fashion so as to constitute a transverse carrier.

Furthermore, the flap or lug 7, provided with a jack 6, is mounted in a sliding fashion, in a transverse direction on the chassis of the tractor and as has been explained above, each of the suspension carriers of the plate 11 being subjected to advancing and retreating forces, as illustrated by arrows $f_3$ and $f_4$, with a jack 14a or 14r which is supported on an appropriate support of a corresponding shoulder 13a or 13r.

These two jacks are analogous to the jack 6 and their two conduits can be fed and purged in series by virtue of the fluid supply which is pressurized by the tractor, by virtue of another distributor 15 and lines 16, an equilibration line 17 between corresponding chambers of the same cross-section assuring the uniformity of effects (advance or retreat) of the jacks 14 (FIG. 8).

It should be noted that the adjustments of the longitudinal and transverse positions of the center of gravity with respect to the wheels makes possible the use of a plate 11 which is substantially lighter than the weights which are known while nevertheless assuring an improved traction and safety.

Although the invention has been described with respect to particular embodiments and means, the scope of the invention should not be construed as being limited to those particulars disclosed but extends instead to all equivalent and alternative embodiments falling within the scope of the claims.

What is claimed is:

1. A weighting device adapted to be suspended beneath a tractor and between both a first and a second pair of wheels of said tractor for increasing the traction and stability of said tractor, said device comprising a flat, elongated plate having a plurality of portions, at least one of said portions having a width less than the spacing between said first pair of wheels, said first pair of wheels adapted to pivot in order to change the direction of said tractor and the width of said at least one portion being sufficiently narrow to allow said first pair of wheels to generally freely pivot, said plate having a longitudinal dimension such that it extends to a rear end of said tractor and beyond a front end of said tractor, said plate further comprising means, adjacent to said tractor front end, for carrying removable weights to prevent said tractor from rearing, said device further comprising means for moving said plate and said weights substantially parallel to the ground, whereby said device comprises a relatively lightweight structure adapted to carry weights necessary to increase the traction and stability of a tractor.

2. The weighting device as defined by claim 1 wherein said elongated plate is adapted to mounted on lug means mounted on said tractor thereby permitting said plate to be displaced in a plane substantially parallel to the ground.

3. The weighting device as defined by claim 2 further comprising control means for controlling the displacement of said elongated plate.

4. The weighting device as defined by claim 3 wherein said control means is manual.

5. The weighting device as defined by claim 3 wherein said control means is automatic.

6. The weighting device as defined by claim 5 wherein said automatic control means comprises means for sensing load variations on the said first pair of wheels.

7. The weighting device as defined by claim 1 wherein said plate comprises two pairs of longitudinal wing flanges respectively arranged on the lateral edges of the front and rear portions of said plate, each of said longitudinal wing flanges being adapted to engage sliding means arranged beneath said tractor.

8. The weighting device as defined by claim 1 wherein said moving means comprises a jack having one end thereof adapted to be mounted on said tractor, said jack further comprising a displaceable piston with fluid supply means arranged on both sides thereof, both of said fluid supply means being connected to a fluid distributor adapted to distribute fluid from a pressurized fluid source whereby said piston reciprocates within said jack thereby moving said elongated element.

9. The load device as defined by claim 8 wherein said jack is mounted on said elongated plate such that said plate may be longitudinally displaced relative to said tractor.

10. The weighting device as defined by claim 9 further comprising lateral wing flanges adapted to slide on rollers thereby permitting said elongated plate to be longitudinally displaced.

11. The weighting device as defined by claim 9 further comprising at least one additional jack mounted on said elongated element such that said plate may be transversely displaced relative to said tractor.

12. The weighting device as defined by claim 11 comprising two additional jacks, each of said jacks being arranged adjacent one end of said plate.

13. The weighting device as defined by claim 12 further comprising braces adapted to be mounted beneath said tractor, said braces comprising rollers adapted to slidingly support said elongated plate thereby permitting said plate to be longitudinally displaced relative to said tractor.

14. The weighting device as defined by claim 13 wherein each of said additional jacks is adapted to be mounted between one of said braces and said tractor, said additional jacks being adapted to laterally displace said brace relative to said tractor.

15. The weighting device as defined by claim 14 wherein each of said braces is adapted to be mounted on said tractor and said jacks are adapted to laterally displace said braces relative to said tractor.

16. The weighting device as defined by claim 15 further comprising a carrier element for mounting said brace on said tractor, said carrier element comprising means for slidably engaging said brace onto said tractor.

17. The weighting device as defined by claim 16 wherein each of said jacks comprises a piston for displacing said brace, and a pair of fluid supply means for feeding fluid to opposite sides of said piston, and both of said jacks are in fluid communication by virtue of an equilibration line whereby both ends of said plate may be simultaneously displaced in the same transverse direction.

18. A weighting device in accordance with claim 1 wherein said portions have substantially the same width and the plate is substantially rectangular.

19. A weighting device in accordance with claim 1 wherein said portions have substantially different widths.

20. A weighting device adapted to be suspended between first and second pairs of wheels of a conventional tractor, said device adapted to increase the traction and stability of said tractor and prevent said tractor from rearing, said device comprising a flat, elongated plate having a rear portion, a median portion, and a front portion, the widths of said front portion and said median portion being sufficiently narrow to permit free pivoting of said first pair of wheels, said plate extending to a rear end of said tractor and beyond a front end of said tractor and including means adjacent to said tractor front end for carrying removable weights, said device further comprising means for moving said plate and said weights substantially parallel to the ground.

21. The device of any one of claims 2, 6, 7, 8, 9, 10, 13, 14, 15, 16, 17, 1, 20, 18, or 19 in combination with a tractor.

* * * * *

UNITED STATES PATENT AND TRADEMARK OFFICE
CERTIFICATE OF CORRECTION

PATENT NO. : 4,322,094

DATED : March 30, 1982

INVENTOR(S) : Emile BOBARD

It is certified that error appears in the above—identified patent and that said Letters Patent is hereby corrected as shown below:

Column 2, line 36, after "4", insert --,--.

Column 6, line 30, "element" should be --plate--.

Signed and Sealed this

Eighth Day of June 1982

[SEAL]

Attest:

Attesting Officer

GERALD J. MOSSINGHOFF

Commissioner of Patents and Trademarks